Aug. 13, 1940.  J. G. CAPSTAFF  2,210,880
FILM PROCESSING MACHINE
Filed March 15, 1938  4 Sheets-Sheet 2
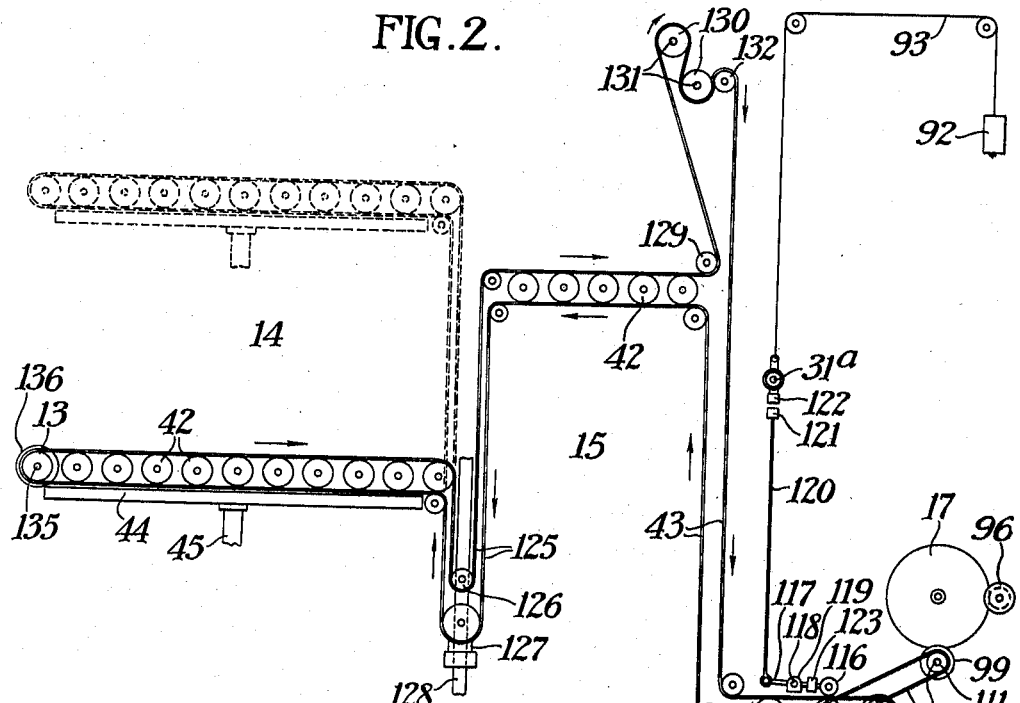
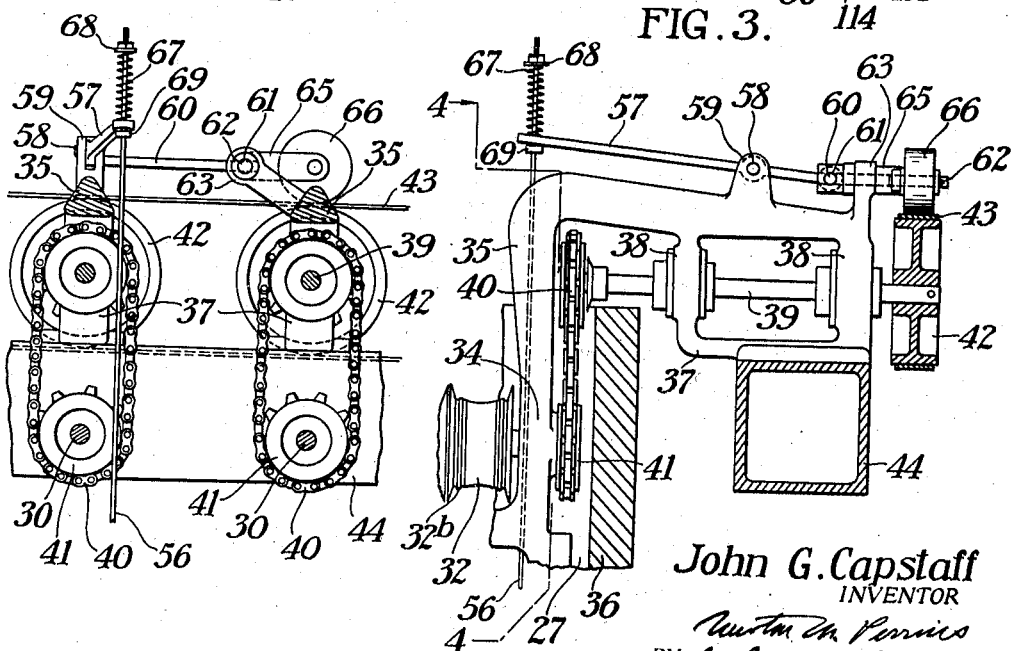
John G. Capstaff
INVENTOR
BY
ATTORNEYS Aug. 13, 1940.  J. G. CAPSTAFF  2,210,880
FILM PROCESSING MACHINE
Filed March 15, 1938  4 Sheets-Sheet 3
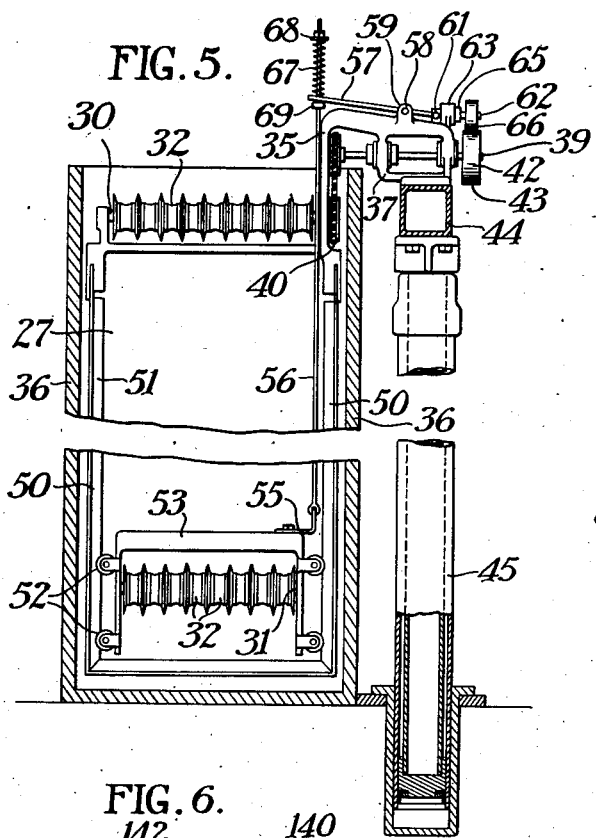
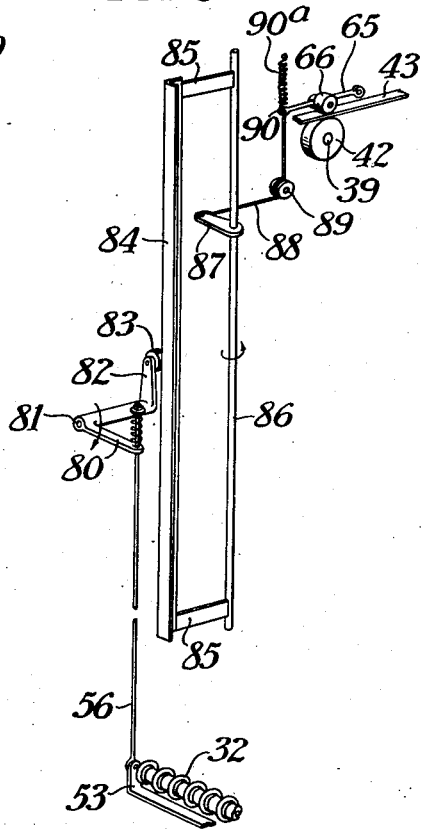
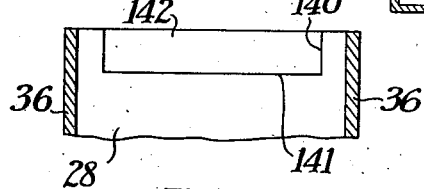
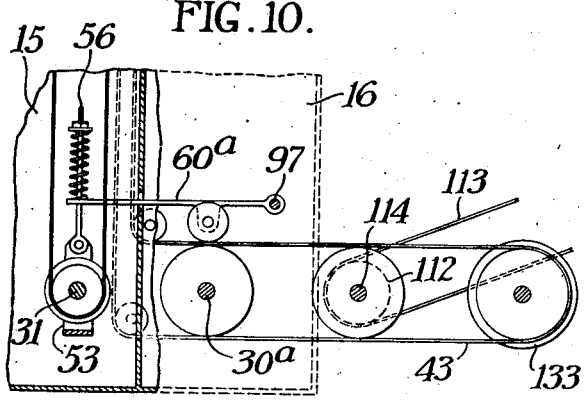
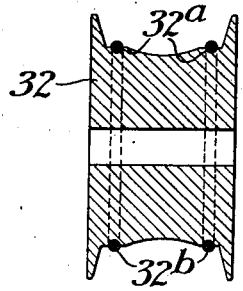
John G. Capstaff
INVENTOR
BY
ATTORNEYS

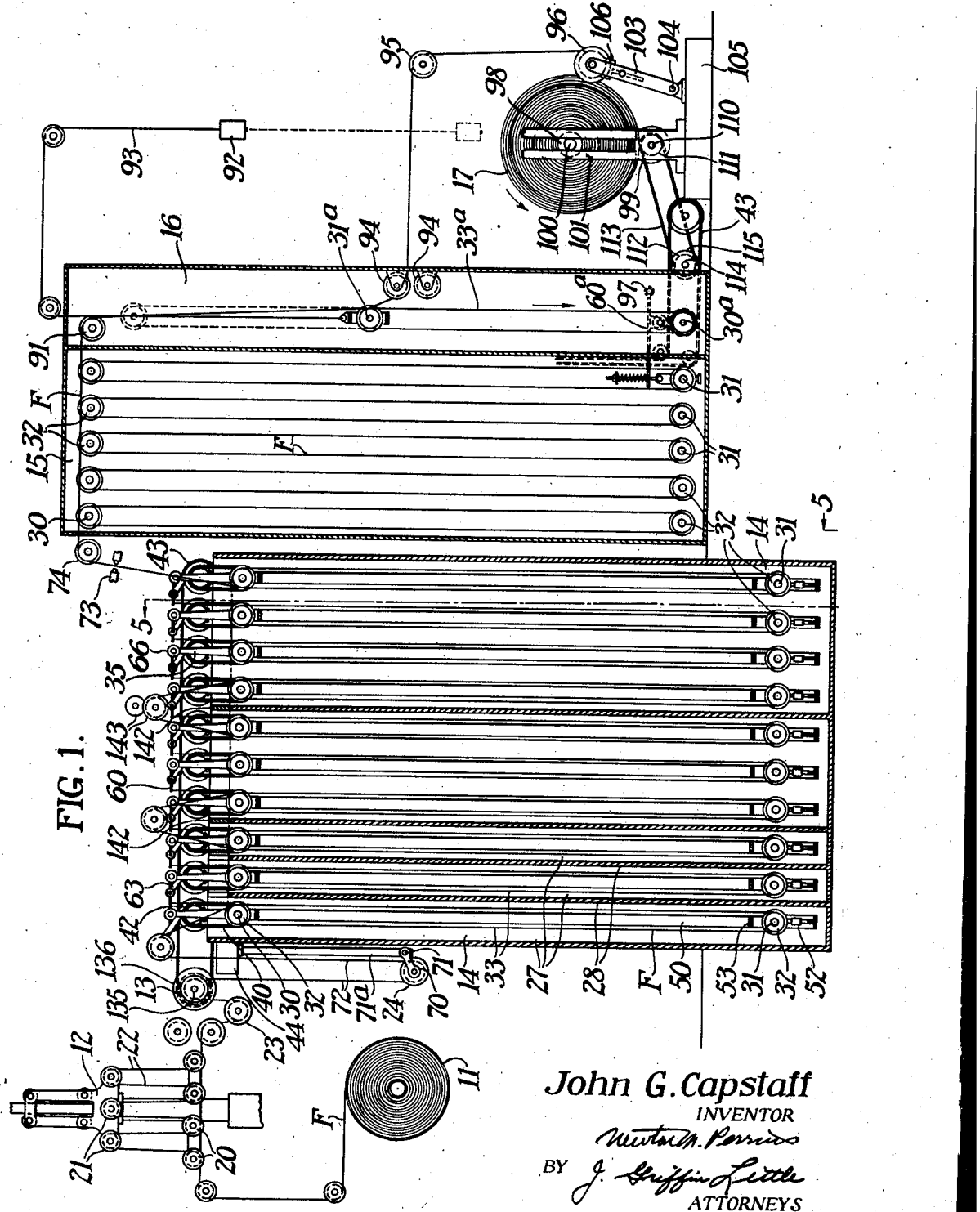

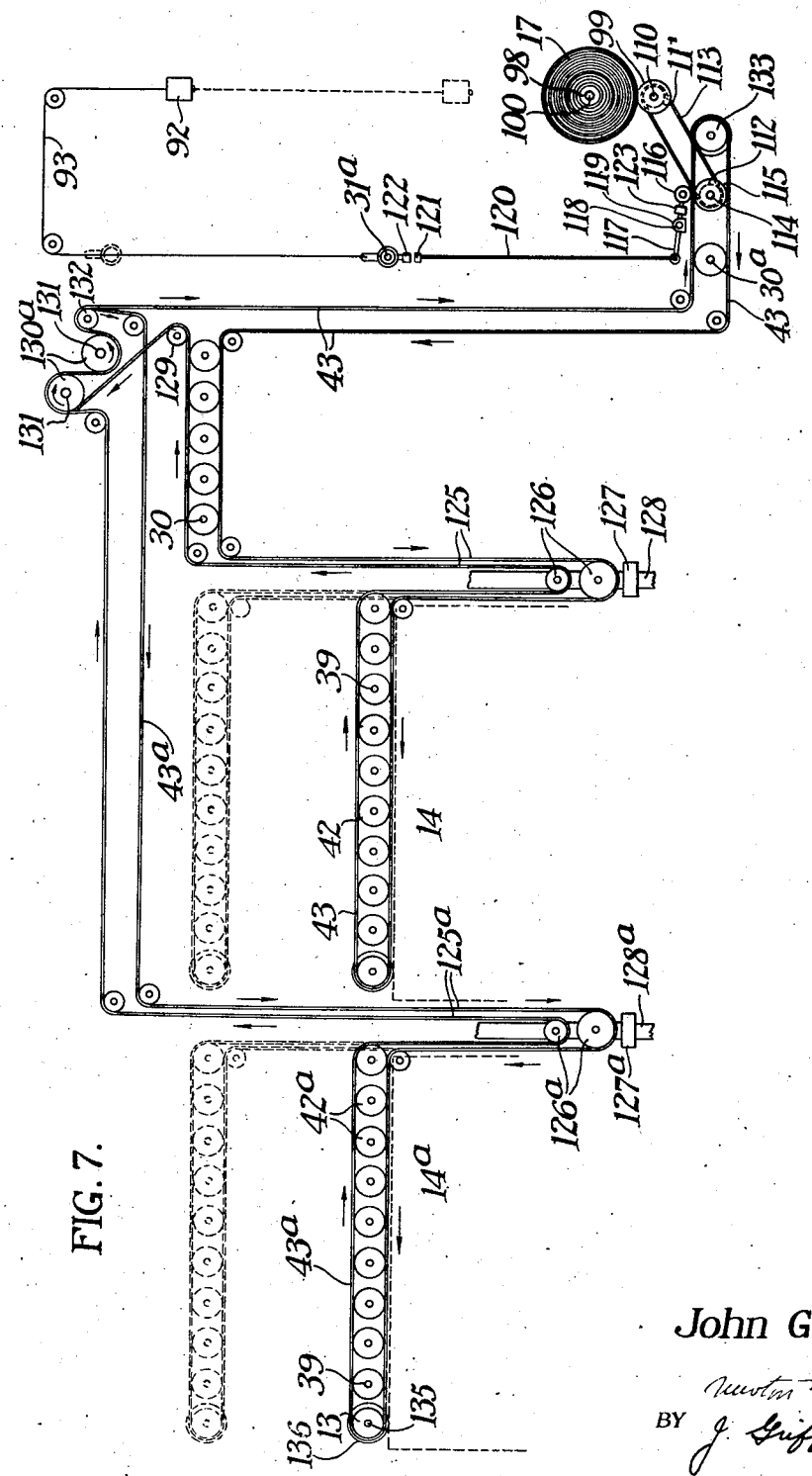

Patented Aug. 13, 1940

2,210,880

UNITED STATES PATENT OFFICE 2,210,880

FILM PROCESSING MACHINE

John G. Capstaff, Rochester, N. Y., assignor to Eastman Kodak Company, Rochester, N. Y., a corporation of New Jersey Application March 15, 1938, Serial No. 196,020

26 Claims. (Cl. 95—94)

This invention relates to the art of developing motion picture film, and more particularly to a machine in which the film strip is successively moved through the various treating fluids to perform the developing, washing, fixing, drying, and other desired operations thereon.

One object of the invention is the provision of a machine of this type which is not only adapted for use with different types and kinds of film, but also films of different widths.

Another object of the invention is the provision of such a machine which is adapted, without adjustments, to handle various films irrespective of the amount of expansion or contraction thereof during the fluid treating and drying operations.

A further object of the invention is the provision of a machine of this class in which the film speed is automatically varied along its path to compensate for stretching or shrinking of the film strip during its passage through the machine.

Still another object of the invention is the provision of a single floating power-belt for driving the entire machine.

Another object of the invention is the provision of a belt drive which is operative in any position of the drive mechanism of the wet section.

Another object of the invention is the provision of such a power-belt which is so arranged as to enable the film propelling mechanisms of the wet section to be elevated without any tendency to strain the film strip.

Yet another object of the invention is the provision of an arrangement whereby the various drive shafts take off only the required amount of power from the floating power-belt.

A still further object of the invention is the provision of a power-belt, of the class described, which regulates the speed of each drive shaft within the limits necessary to cover the maximum expansion and/or contraction of the type of film being processed.

Another object of the invention is the provision of a power-belt of this class which also controls the speed of the take-up or film roller in direct proportion to the rate of discharge of the film strip from the drying section of the machine.

Another object of the invention is the provision of drive shafts and idler shafts of proper relative diameters to provide sufficient friction or tendency drive to propel the film strip through the machine.

Another object of the invention is the provision of an arrangement of lower pulley floaters the weights of which control the tension of the film strip.

Another object of the invention is the provision of an arrangement for controlling the speed of the various drive shafts and the film roller from the lower floaters, the floaters controlling the speed with which the film strip is taken off by the next drive shaft or the film roller.

To these and other ends, the invention resides in certain improvements and combinations of parts all as will be hereinafter more fully described, the novel features being pointed out in the claims at the end of the specification.

In the drawings:

Fig. 1 is a vertical sectional view through a film processing machine constructed in accordance with the present invention, showing the general arrangement of the various parts;

Fig. 2 is a schematic view of one arrangement of the floating power-belt by which the various parts of the machine are driven;

Fig. 3 is a fragmentary vertical sectional view through a portion of the wet section of the machine, on a larger scale than Fig. 1, showing the arrangement by which the power is taken off the floating belt, and the manner in which this power is transmitted to one of the upper submerged drive shafts in the wet section of the machine;

Fig. 4 is a view taken substantially on line 4—4 of Fig. 3, showing the arrangement by which only the proper amount of power is taken off the floating belt;

Fig. 5 is a transverse vertical sectional view taken through the wet section of the machine substantially on the line 5—5 of Fig. 1, showing the arrangement of one of the upper drive shafts, and the cooperating lower floating idler shaft;

Fig. 6 is a transverse vertical sectional view of the upper portion of one of the partition members which separate the various treating tanks, showing the arrangement of the detachable partition portion;

Fig. 7 is a schematic view of another floating belt arrangement adapted for use with long machines, showing the arrangement by which separate parts of the driving mechanism for the wet section of the machine may be independently elevated;

Fig. 8 is a perspective view of the mechanism by which the speed of the first drive shaft of the drying section is controlled by the last floater in the wet section;

Fig. 9 is a longitudinal sectional view of one of the film pulleys, showing the arrangement of the rubber tires or bands for supporting the film strip adjacent the edges thereof; and Fig. 10 is a fragmentary detailed view, on a larger scale than Fig. 1, of a portion of the machine adjacent the discharge end thereof, showing the arrangement for controlling the drive shaft in the film reserve supply section.

Similar reference numerals throughout the various views indicate the same parts.

In the processing of motion picture film, the latter is first passed through the various liquid treating baths in which the film strip is processed to a negative or positive, washed, fixed, dyed, or otherwise treated with various liquids. During this passage through these baths, the film strip becomes wet and expands or stretches. The processed film is then passed through a drying compartment or chamber in which the film is dried. Such drying causes a contraction or shrinkage of the film strip. As the film strip is being fed continuously through the machine, part of the strip will be in the wet section of the machine and will, therefore, be stretching; and another portion of the strip will be in the drying section and will be shrinking. Thus the strip will be subjected to both stretching and shrinking. In addition, the rate of stretching and shrinking will vary at different points along the strip, and with different types and sizes of film. The disadvantages of this stretching and shrinking are well known to those in the art.

The present invention provides a processing machine in which the film strip is processed, dried, and finally wound onto a film roller. The film is propelled through the machine by means of pulleys which are loosely mounted on the various drive shafts, as later described. These drive shafts are arranged to be operatively connected to a floating power-belt from which power is derived for rotating the drive shafts. The amount of power taken from the belt by any one drive shaft is dependent entirely upon the film speed at that point. For example, if the film strip has expanded excessively, the power belt is pressed to transmit the proper amount of power to the drive shaft to rotate the latter at the required speed. If, on the other hand, the film has shrunk, the pressure on the power-belt is reduced to thereby decrease the speed of the drive shaft to that required. The engaging and disengaging of the belt and the drive shaft is controlled by the position of the preceding lower pulley floater from which the film strip is drawn by the drive shaft. Likewise, the winding of the finished film strip into the film roller is controlled entirely by the position of the last floating shaft or floater of the drying section, all as will be hereinafter more fully described.

The present invention is embodied in a machine which is equally well adapted for use with films of different composition such as cellulose and/or nitrate film, or films of different widths such as 8 mm., 16 mm., or 35 mm. In addition, the machine may be used to process black and white, "Kodachrome," or other films to a positive or negative, to dye or tint a film, and for various other processes to which motion picture films are subjected. In other words, the machine is extremely versatile, and is adapted, without adjustment, to handle a film strip irrespective of whether the stretch or shrinkage is large or small. While the machine is primarily designed for use with motion picture film, it is apparent that it is adapted for use with a wide variety of materials in strip form. The term "film" is, therefore, used in its generic sense to cover all sheet materials arranged in a substantially continuous strip or sheet.

Referring now to the drawings, and particularly to Fig. 1, there is shown a film processing machine constructed in accordance with the preferred embodiment of the invention. The machine comprises, in its broadest aspect, a supply reel 11, a film takeup 12, a feed-in roller 13, wet and dry sections, generally indicated by the numerals 14 and 15 respectively, a film reserve supply section 16, and a film roller 17. The film strip F, to be processed, is fed from the supply reel 11, by the feed-in roller 13, through the film takeup 12 which comprises, in general, a plurality of stationary rollers 20 and a plurality of movable rollers 21 which move relative to the rollers 20. The strip F is wound in loops 22 over these rollers, and provides a reserve supply which permits splicing of the film without necessitating the shutting down of the machine, as is well known to those in the art. From the takeup 12, the film strip passes under an idler roller 23, over the rubber covered feed-in roller 13, thence under a floating idler roller 24 to be later described, and finally to the first drive shaft of the wet section of the machine, all as illustrated in Fig. 1.

The wet section of the machine is divided into a series of liquid treating chambers or compartments 27 which are separated by means of the partitions 28, as best shown in Fig. 1. Each of these compartments is arranged to hold a treating liquid which may be the same or different from the liquid in the adjacent compartment. By means of this construction, various arrangements of treating compartments may be provided to suit the particular process involved. Each of these compartments has mounted therein, in a manner to be later more fully described, an upper drive shaft 30 and a lower floating idler shaft 31. Both of these shafts are positioned below the level of the liquid in the compartment so that the film strip is always submerged while in any particular treating liquid. Each of the shafts 30 and 31 has loosely mounted thereon a plurality of pulleys 32, see Fig. 5, over which the film strip F is wound in helical loops 33. As the pulleys 32 on each of the drive shafts 30 are loosely mounted thereon, they are driven partly by virtue of their weight on the shaft, but primarily by reason of the film loops 33 which are drawn tightly thereover, as later described, thus providing a friction or tendency drive for the film strip.

The loosely mounted pulleys 32 on the idler shafts 31 are preferably of the same composition and outer diameter as the loosely mounted pulleys 32 on the drive shafts 30. These various loose pulleys effectively distribute the driving force so that the film strip does not slip or abrade on the pulleys, but rather, the pulleys slip on their shafts. Thus, as each pulley 32 is loosely mounted on its shaft, the pulley can automatically adjust itself to compensate for the expansion or contraction of the film strip.

The pulleys 32 may become etched and/or roughened by the various treating liquids, and may thus tend to abrade the film strip along the edges thereof. In order to overcome this difficulty, each pulley 32 is preferably provided with a pair of peripheral grooves 32a, see Fig. 9, in which are positioned soft resilient tires 32b of rubber or other suitable material to support the edges of the film strip F and space the latter from the pulleys 32. This spacing of the film strip from the pulleys 32 is particularly advantageous when double coated film is processed. In addition, the rubber tires 32b give more drive to the film strip.

As the film strip F is propelled through the machine, certain counter-forces or resistances are encountered which retard the forward movement of the strip. These resistances comprise the frictional drag of the lower pulleys 32 on their shafts, as well as the fluid drag on all of the pulleys and the moving film strip. Obviously, sufficient friction or tendency drive must be imparted to the drive shafts 30 to not only propel the film through the machine, but to also overcome these various drags. This necessary torque or tendency driving force is secured, in the preferred embodiment, by making the upper drive shafts 30 of sufficiently larger diameter than the lower idler shafts 31 to give a tendency drive which is an excess of that actually necessary to overcome these drags and to effectively propel the strip through the machine. The same effect may, however, be secured by making the upper pulleys 32 of a material which has a higher coefficient of friction than the pulley 32 on the idler shafts 31. On the other hand, the upper pulleys 32 may be made smaller than the lower pulleys, or the upper pulley may be spring pressed so as to grab the drive shaft 30 with greater friction.

Each of the drive shafts 30 is journaled in bearings 34 formed in a casting 35, of the shape best shown in Figs. 3 and 5. This casting projects above the liquid level of the compartment 27 and over the side wall 36 thereof to provide a rectangular frame member 37 which affords spaced bearings 38 for a shaft 39 which is operatively connected to the submerged upper drive shaft 30 by any suitable means such, for example, as a chain 40 which runs over sprockets 41 on the adjacent ends of the shafts 30 and 39, as clearly illustrated in Figs. 3, 4, and 5. Each of the shafts 39 have secured thereto a flangeless pulley 42 over which a floating power-belt, generally indicated by the numeral 43 and to be later more fully described, is arranged to run, to transmit power to the shaft 30 so that the latter may be rotated to frictionally drive the rollers 32 thereon so as to propel the film strip F through the machine. The various castings 35 are secured, in any suitable manner, to a box girder 44 which, in turn, is secured to the top of a fluid lift-hoist 45, see Fig. 5, of any well-known construction, by which the mechanisms in the liquid compartments may be elevated, as a unit, for threading.

Each of the castings 35 carries a depending rack 50, the vertical sides of which provide T-shaped tracks 51 for guide rollers 52 of a suitably weighted lower pulley floater 53 in which one of the idler shafts 31 is mounted. The shaft 31 thus moves as a unit with the floater 53, and may be broadly considered as a floating idler shaft on which the film pulleys 32 are loosely mounted, the purpose of which construction will be later described. As the rack 50 is secured to and supported from the casting 35, the lower idler shaft 31 and floater 53 will be lifted as a unit with the upper drive shaft 30 when the casting 35 is raised by the lift-hoist 45.

It will be apparent upon an inspection of Fig. 1, that each lower idler shaft 31 is suspended in and supported entirely by the film loops 33. However, as the shaft 31 is mounted in the floater 53, the latter is also supported by these film loops. The weight of the floater tends to elongate the loops and thus provides the main means for tensioning the film strip, the various floaters being substantially equal in weight. As the tension of the strip is thus determined primarily by the weight of the floaters 53, the tension is substantially constant through the entire machine, thus eliminating undesirable local pulls. In addition, the position of each floater 53 determines the amount of power applied to, and hence the speed of, the next drive shaft 30, as will be later more fully pointed out. Furthermore, the weight of the lower floaters 53 pulls the film loop 33 tightly over the upper pulleys 32, and thus determines the amount of frictional drive imparted to the latter by the drive shafts 30.

The upper edge of each of the floaters 53 carries an L-shaped bracket 55, to which is secured a rod 56 which extends through one end of a lever 57 pivoted intermediate its ends at 58 to an ear 59 formed on the casting 35. The other end of the lever 57 is connected to the free end of a lever 60 which extends through an aperture 61 in one end of a shaft 62 journaled in a bearing 63 projecting upwardly from the casting 35, as clearly illustrated in Figs. 3 and 4. The other end of the shaft 62 has secured thereto an arm 65, the free end of which carries a small pressure roller 66 which is arranged to engage and press the floating belt 43 into driving engagement with the pulley 42 secured to the next shaft 39, which, in turn, is connected to the next or following upper drive shaft 30, as is apparent from an inspection of Fig. 4.

Since each drive shaft 30 is designed to have an excess tendency drive, obviously, the film strip would be drawn from each lower floater 53 at a rate faster than it is being fed thereto, and the floater would rise until it struck a stop or some abutment. In the present machine, however, this does not occur as all the upper drive shafts are frictionally driven by means of the floating power-belt 43 which tends to turn all the pulleys 42 and the drive shafts 30 at the same speed. However, the amount of power actually transmitted to each drive shaft, and hence the speed thereof, is regulated by the small pressure roller 66. The greater the pressure of this roller on the belt 43 the greater the power transmitted to the corresponding drive shaft 30, and conversely. As the pressure roller 66 is connected by means of the rod 56 and levers 57 and 60, to the preceding floater 53, the position of the latter will determine the pressure exerted by the roller 16, and hence the speed of the next drive shaft 30. This belt drive thus regulates the speed of each drive shaft within the limits necessary to cover the maximum stretching and shrinking of the different films to be processed. However, after the initial stretch has taken place, the floaters 53 remain substantially stationary, and all the drive shafts 30 are then driven at the required relative speeds. The machine is thus extremely versatile. It is adapted, without adjustments, to handle films regardless of whether the stretch and/or shrinkage is large or small. All limits are determined by the ratio of the diameters of the pulleys 32 on the drive shafts 30, and the diameter of the feed-in roller 13, hereafter more fully described.

Referring now to Figs. 3 and 4, it is apparent that if the left end of the lever 57, as viewed in Fig. 3, is moved downwardly, the right end thereof will be moved upwardly. This movement of the lever 57 will lift the left end of the lever 60 and thus rotate the shaft 62 in a clockwise direction, as viewed in Fig. 4. When the shaft 62 is thus rotated, the roller 66 presses the belt 43 into driving engagement with the pulley 42 so as to transmit power to the next drive shaft 30, as shown in Fig. 4. The amount of power transmitted by the belt 43 obviously depends upon the pressure exerted by the roller 66 on the belt 43. If, on the other hand, the left end of the lever 57, as viewed in Fig. 3, is moved upwardly, the pressure of the roller 66 on the belt 43 is reduced so that the latter will slip on the pulley 42 to decrease the amount of power transmitted to the next drive shaft 30, as will be apparent from an inspection of Figs. 3 and 4. In normal operation, there is always a slight slip of the belt 43 on the pulleys 42.

As the lever 57 is connected by means of the rod 56 to the preceding lower pulley floater 53, it is apparent that any movement of the latter will pivot the lever 57. Furthermore, the position of the floater 53 and the lower idler shaft 31 will also determine the amount of power taken off by the next upper drive shaft 30. For example, if a floater 53 moves downwardly, thus indicating that the film strip is being fed thereto faster than it is being drawn therefrom, the left end of the lever 57, as viewed in Fig. 3, also moves downwardly to cause the belt 43 to engage the following pulley 42 to increase the power taken off by the next upper drive shaft 30 to increase the speed of the latter. Conversely, if the floater 53 moves upwardly, indicating that the film strip is being withdrawn faster than it is being fed, the belt 43 is moved to either totally or partially disengage the next drive shaft to decrease the speed thereof. This floating belt 43 and the various pulleys 42 thus provide, in effect, a clutch arrangement by which varying amounts of power may be taken off the floating belt by the different drive shafts 30 to vary and control the speed of the latter. The amount of power actually taken off the belt 43 by any one drive shaft 30 is determined by the position of the preceding floater 53 and its idler shaft 31, so that the latter controls the connection between the drive shaft and the floating power-belt. The time of liquid treatment in any compartment may be controlled through a limited degree by adjusting the height of the floater 53, in any suitable well known manner. Of course, the necessary adjustment of the lever 57 on the rod 56 must be then made.

It is apparent from the above description, that by means of the pressure rollers 66 and the levers 57 and 60, any upward movement of the floater 53 will release or decrease the pressure of the roller 66 on the belt 43 so that the latter may slip on the pulley 42 to thereby decrease the power transmitted to the next drive shaft 30 to control the speed thereof. While movement of the floater 53 is thus utilized to adjust the speed of the next drive shaft 30, this movement is slight and gradual. Furthermore, as the idler shaft 31 is mounted on and movable as a unit with the floater 53, the roller 66 may be broadly considered as controlled by the movement of the idler shaft.

The weight of each floater 53 is such as to provide a film tension of approximately 6 ounces per strand. With this tension and low film speeds, the machine would work quite satisfactorily with all the pulleys 32 on the drive shafts 30 loosely mounted thereon, as above described. If, however, higher film speeds are desirable, it will be necessary to either increase the film tension by increasing the weight of the floaters 53 or preferably to have one of the pulleys 32 on each drive shaft attached or fixed thereto. These fixed pulleys are preferably the second pulleys from the feed-in end of the drive shafts, and are also of smaller diameter than the other loose pulleys 32 but larger than the pulley 13. By reason of this smaller diameter of the fixed pulleys, the drive shaft speed will be somewhat faster than the film speed, thus enabling the loosely mounted pulleys to contribute to the driving of the film strip through the machine.

Each lever 57 is preferably spring pressed, as illustrated in Figs. 3 and 4. To this end, a coil spring 67 is interposed between the lever 57 and a collar 68 secured to the rod 56, in any suitable and well known manner. A second collar 69, also secured to the rod 56, is positioned below the lever 57, all as clearly shown in Figs. 3 and 4. Obviously, the spring 67 may be adjusted so that the pressure roller 66 is either pressed into or out of engagement with the belt 43, as will be apparent. In addition, the spring 67 prevents the weight of the floater 53 being taken on the rod 56 rather than on the film strip, in case the floater moves to its lowermost position, thus enabling the floater to still maintain the proper film tension. The larger mechanical advantage of the levers 57 and 60 requires only a small part of the weight of the floater 53 to actuate the levers.

It is evident that the first drive shaft 30 of the wet section 14 cannot be controlled from a preceding floater rack 53, as are the other drive shafts. Therefore, the roller 24 between the feed-in roller 13 and the first drive shaft 30 of the wet section 14 is preferably rotatably mounted on the free end of an arm 70 which is pivoted at 71 to a suitable support 71a secured to the beam 44 or the castings 35. This floating roller 24 is suitably weighted, and is supported in the film loop 72. This roller thus constitutes a floater for controlling the speed of the first drive shaft of the wet section, in the same manner as the above-described floaters 53 control the speeds of the other drive shafts 30. Parts corresponding to the above-described control mechanism are designated by the same numerals and need not be again described.

As the film strip F leaves the wet section 14 of the machine, it passes through an air squeegee 73, of any well known construction, by which the adhering liquid is removed from the film strip prior to the passing thereof to the drying section 15. After leaving the squeegee, the film strip passes over an idler roller 74 to the rollers 32 on the first upper drive shaft 30 of the drying section 15. The parts in the drying section which correspond to those in the wet section will be designated by the same numerals. As the drive shafts 30 of the drying section are obviously not submerged, the pulleys 42 may be secured directly to the ends of the drive shafts 30 so as to provide a direct driving connection between the floating belt 43 and the various drive shafts 30. Furthermore, as there is no liquid drag present in the drying section, the drive shafts 30 thereof may, obviously, be somewhat smaller than the drive shafts in the wet section of the machine. In addition, very little power is needed to move the film strip. For this reason the pulleys 42 of the drying section may be arranged on a slight arc so that when the belt 43 is pulled tight it just clears the pulleys 42. By means of this arrangement, it is possible to go all the way from getting no drive on the pulleys 42 to whatever drive is necessary to give the drive shaft the proper speed.

The lower idler shafts 31, with its roller 32, are mounted in weighted lower pulley floaters, not shown, which are the same construction as the floaters 53 used in the wet section of the machine, and above described. As the film strip shrinks on drying, the speed of the various drive shafts 30 in the drying section, are varied to compensate for this shrinkage. The speed of these various drive shafts, except the first, is controlled in the identical manner as that of the drive shafts 30 in the wet section, and need not be again described. However, after the initial shrinkage has taken place the racks 53 are substantially stationary, as in the wet section, and the various drive shafts 30 are then driven at the required relative speeds.

The first drive shaft 30 in the drying section is, however, controlled from the last floater in the wet section, in the manner clearly illustrated in Fig. 8. In this figure, the roller 66 is mounted on the arm 65 which is pivotally arranged substantially in the manner shown in Fig. 4 except that the roller 66 is mounted on the opposite side of its pivot. It is apparent that if the roller 66 is pressed downwardly against the belt 43, the speed of the first drive shaft of the drying section will be increased, and conversely. The present invention provides a mechanism which not only controls the roller 66 from the last floater in the wet section, but also enables the wet section to be elevated, as above described.

To secure this result, the rod 56 of the last wet section floater 53 is connected to an arm 80 secured to and extending radially from one end of a shaft 81 to the other end of which is secured a radially extending arm 82 arranged at right angles to the arm 80, as shown in Fig. 8. The arms 80 and 82 thus provide, in effect a bell crank which is pivotally mounted on the shaft 81. The free end of the arm 82 carries a roller 83 adapted to engage a vertical guide 84 connected by the radial arms 85 to a shaft 86. A lever 87 is secured to the shaft 86, and is connected by a cord or cable 88, which runs under an idler pulley 89, to the end of an arm 90 secured to the roller 66, all of which is clearly illustrated in Fig. 8.

It is now apparent from an inspection of Fig. 8, that if this last floater 53 in the wet section moves downwardly, it will correspondingly move the arm 80 to rotate the shaft 81 in a clockwise direction, as indicated by the arrow. This rotation of the shaft 81 moves the arm 82 so that the roller 83 engages and moves the guide 84 in a counterclockwise direction about the shaft 86. As the guide 84 is connected by the arms 85 to the shaft 86 the latter is also rotated, as indicated. When the shaft 86 is thus moved, the lever 87 pulls the cord 88 to the left, thus pressing the roller 66 against the belt 43, as will be apparent upon inspection of Fig. 8. If, on the other hand, the floater 53 moves upwardly, the roller 66 is also moved upwardly, by reason of the spring 90a to reduce the speed of the first dryer drive shaft. The spring 90a has one end thereof secured to the arm 90, and the other end anchored to the casing of the drying section 15. When, however, the wet section is elevated, in the manner and for the purpose to be described, the roller 83 will ride along the guide 84 which provides a track for the roller 83. By means of this arrangement, the speed of the first drive shaft in the drying section is controlled from the last floater in the wet section, and this control is operative regardless of whether the wet section is raised or lowered, or at any intermediate position.

After being sufficiently dried, the film strip F passes out of the drying section 15, over an idler roller 91 to the reserve supply section 16 in which a drive and idler shaft are positioned. While the section 16 is shown as distinct from the drying section 15, it may obviously constitute a part thereof. Therefore, sections 15 and 16 may be broadly considered as the drying section.

The drive and idler shafts of the section 16 are identical in structure with those in the wet and drying sections of the machine except that the drive shaft is below the floating idler shaft and adjacent the bottom of the section 16, as clearly shown in Fig. 1. However, in order to clearly differentiate these inverted drive and idler shafts from those in the wet and drying sections, they are designated by the numerals 30a and 31a respectively. The idler shaft 31a and its movable rack or floater are suitably weighted by means of a counterweight 92 which is connected by means of a cord or cable 93 with the floater, the cable passing over suitable idler rollers, as shown in the drawings. It is thus apparent that the floater in the section 16 operates in exactly the same manner as the floaters 53, above described. The film strip is wound in loops 33a over the pulleys on the shafts 30a and 31a, and then passes over one of the idler rollers 94 and out of the section 16, and thence over the idler roller 95 and finally under a flanged roller 96 to the film roller 17.

It is apparent that section 16 provides a film reserve or accumulation arrangement which permits filled rollers 17 to be removed and replaced with empty rollers without necessitating the shutting down of the machine. During this replacement operation the machine is still running, thus continuously feeding film into the section 16. However, as the discharge from the section 16 is stopped during such replacement, obviously the floater with its shaft 31a will continue to rise upwardly, as shown in dotted lines, Fig. 1. It is because of this excessive movement of the floater during the replacement operation that the floater is preferably positioned above the drive shaft, as shown. This reverse arrangement also facilitates rethreading in cases of breaks in the film strip.

The drive shaft 30a is also driven by the power belt 43, as shown in Figs. 2 and 7, to pull the film strip F from the last floater 53 of the drying section 15. This last floater also controls the speed of the shaft 30a in a manner shown in Fig. 10. This control arrangement is somewhat similar, and identical in principle, to that shown in Figs. 3 and 4, above described, except that the lever 60a has one end thereof pivoted at 97 on the casing of the section 16 while the other end is connected directly to the rod 56, which in this case is obviously shorter than the other rods 56, all of which is clearly shown in Fig. 10. By means of this arrangement the drive shaft 30a in the section 16 is controlled by the last floater 53 in the drying section 15.

The film roller 17 is preferably in the form of a solid core 98 on which the successive convolutions of the film strip are wound. A flanged rubber covered roller 99 supports the film roller 17, as shown in Fig. 1, and also drives the latter by reason of the frictional engagement between the surface of the roller 99 and the outer film convolution on the film roller. The core 98 has reduced end portions 100 which are journaled in forked guide bearings 101, of the shape shown in Fig. 1, positioned on opposite sides of the film roller 17. It is apparent that as the size of the film roller increases, the portions 100 will move upwardly in the bearings 101, the weight of the roller being then supported by the roller 99. The flanges of the roller 99 engage the edges of the film strip to align the various film convolutions. The flanges of the roller 96 also engage the edges of the film strip, and cooperate with the flanges of the roller 99 to properly align the successive film convolutions so as to provide a flat roll, the advantage of which are obvious.

In addition, the roller 96 assures a relatively long wrap of film between the roller 96 and the roller 99 so that the outer film convolution is snubbed or drawn tightly so that the roller 99 may readily revolve the entire film roller 17. As this film roller increases in size, the roller 96 will obviously move outwardly or to the right, as viewed in Fig. 1. In order to enable the roller 96 to thus move, it is rotatably mounted on the free end of a supporting arm 103 which is pivoted at 104 to the machine frame 105, all of which is clearly shown in Fig. 1. When sufficient film has been wound onto the film roller 17, the film strip is cut between the roller 96 and the film roller, and the full roller is removed and replaced by a new core 98. During this change, the machine is still operating so that it is necessary to hold or clamp the cut end of the film strip. To this end, a suitable brake 106, of any well known construction, may be provided on the arm 103 to engage the film strip and to clamp the latter against the surface of the roll 96. After the new core has been placed in position, this brake is released to permit the film strip to be wound on the core.

The rubber covered roller 99 is rotatably mounted on the shaft 110 which is supported, on opposite sides of the roller 99, in the bearings 101 which extend upwardly from the machine frame 105, as shown in Fig. 1. The shaft 110 also carries a pulley 111 which is operatively connected to a pulley 112 by reason of a non-slip belt 113. The pulley 112 is mounted on the shaft 114 of the pulley 115, the latter being identical with the pulleys 42, see Figs. 2 and 7. The speed of the pulley 115 is controlled by means of a small pressure roller 116 identical with the rollers 66, above described, which is arranged to engage the floating power belt 43 to press the latter into driving engagement with the pulleys 115, as clearly shown in Figs. 2 and 7.

The roller 116 is mounted on one end of a rod 117 pivoted at 118 in the bearing 119. The other end of the rod 117 has secured thereto a rod 120, the upper end of which carries a block 121 adapted to engage a similar block 122 carried by and movable as a unit with the floater shaft 31a. As the shaft 31a moves upwardly, as above described, the block 122 moves out of engagement with the block 121. A weight 123 on the rod 117 then moves the roller 116 to press the belt 43 to drive the shaft 114 and hence the film roller 17. When, however, the shaft 31a again moves downwardly, the block 122 engages the block 121 to partly or totally lift the roller 116 to decrease the speed of the drive shaft 114. Thus the film roller 17 is operatively connected to and controlled by the floater shaft 31a which may be broadly considered as the last floater in the drying section. Therefore, the winding of the film strip on the film roller is in direct proportion to the rate of discharge of the strip from the drying section.

Referring now to Fig. 2, the left group of pulleys 42 represent those of the wet section 14, while the middle group represent those in the drying section 15. In order to initially thread the film strip through the wet section, the entire feeding mechanism thereof, between the shafts 30 and 31 and the floaters 53, is lifted out of the treating solution by means of the lift-joist 45, above described. During this operation, the left portion of the floating belt 43, as viewed in Fig. 2, is raised to the dotted position. In order to permit this relative movement between different portions of the belt 43, the latter is formed to provide a pair of depending loops 125 intermediate the wet and dry sections of the machine. These loops pass under a pair of pulleys 126 rotatably mounted on a weighted slide 127 movable mounted on a suitable supporting frame 128.

By means of this arrangement, the portion of the floating belt 43 connected to the wet section of the machine may be moved relative to the portion thereof connected to the drying section without disengaging the belt 43 from the pulleys 42. Furthermore, because of this construction, this raising of the feed mechanism of the wet section 14 may be performed either with the machine stationary or in full operation and running at the necessary speed without any tendency to strain the film strip, the advantages of which are readily apparent to those in the art. The raising operation may, however, be equally well performed when the machine is stopped, in which case all the pulleys 42, as well as the belt 43, remain stationary and the film strip is not moved.

The floating belt 43, passes over an idler roll 129 and is then looped over and driven by means of a set of pulleys 130, see Fig. 2, mounted on shafts 131 positioned adjacent the discharged end of the drying section. These shafts 131 are geared together and are connected, through a variable speed drive, not shown, to a suitable prime mover such, for example, as an electric motor, not shown. The belt 43 is then run over an idler pulley 132, and thence downwardly to drive the shafts 30a and 114. The belt 43 is then wrapped around a flanged pulley 133 and is then run along the under side of the pulleys 42, all as shown in Figs. 2 and 7, suitable idler pulleys being of course provided whenever the direction of movement of the belt is changed.

In short machines, the power-belt arrangement illustrated in Fig. 2 has been found satisfactory. However, in long machines, it is desirable to split the wet section so as to decrease the load which is to be lifted by any one hoisting means, such as the hoist 45 above described. When, however, the wet section is thus divided, it is preferred to arrange the power-belt drive so that each portion of the wet section may be separately and independently elevated for threading, much in the manner illustrated in Fig. 2. It is obvious that such an arrangement may be secured by using a power belt of sufficient length, and providing additional loops and pulleys similar to 125 and 126 respectively between the two wet portions. It is preferred, however, to use a separate power-belt for each of the wet sections, as shown in Fig. 7, parts corresponding to those in Fig. 2 being designated by the same numerals.

Each of the shafts 131 of the belt driving mechanism has mounted thereon a pair of pulleys 130a. The belt 43 is wrapped around one set of the pulleys in the manner shown in Fig. 7, and is arranged to engage and drive the pulleys 42, in the manner above described. A second floating power belt 43a, similar to the belt 43, is wrapped around the other set of pulleys 130a, and is arranged to drive the pulleys 42a in the same manner as the belt 43, the pulleys 42a being, of course, identical with the pulleys 42. The wet portion 14 may be elevated by reason of the loop 125 and pulleys 126, as previously pointed out. In order to enable the driving mechanism of the portion 14a to be elevated, the belt 43a is also formed to provide a pair of depending loops 125a positioned intermediate the wet portions 14 and 14a. These loops pass under a pair of pulleys 126a rotatably mounted on a weighted slide 127a movably mounted on a suitable supporting frame 128a, all as shown in Fig. 7.

By means of this arrangement, the floating belts connected to each of the portions 14 and 14a may be independently moved relative to each other. Furthermore, the raising of the feed mechanism in each of these wet portions may be performed either while the machine is stationary or in full operation and moving at the necessary speed, as pointed out in connection with Fig. 2.

The feed-in roller 13 is preferably rubber covered and, in the embodiment shown in Fig. 2, is mounted on one end of a shaft 135. The other end of the shaft 135 carries a flanged pulley 136, of the same diameter and similar to the pulleys 42, over which the belt 43 is wrapped, see Fig. 2. The belt 43 thus positively drives the feed-in roller 13 at a uniform rate of speed so that the film strip is continuously and smoothly fed into the first compartment of the wet section 14 or 14a. The diameter of the rollers 13 is, however, slightly smaller than that of the pulleys 32 by an amount which is more than sufficient to compensate for the expansion of the strip as it passes through the liquid baths. By reason of this difference in diameter, the tendency driven pulleys 32 tend to propel the strip faster than it is being fed by the feed-in roller 13. In the embodiment shown in Fig. 7, the feed-in roller 13 is also mounted on one end of the shaft 135, the other end of which carries the flanged pulley 136 over which the belt 43a is wrapped to positively drive the roller 13, in the same manner as the belt arrangement shown in Fig. 2 and above described.

As the partitions 28 extend the full height of the compartments 27, the wet section is thus divided into a plurality of small non-liquid-communicating sections. Normally, several adjacent compartments are usually filled with the same liquid, such as developer, while an adjacent group of compartments may be filled with wash water, while a third group may be filled with fixing solution. It is desirable, however, to have the various compartments which contain the same liquid, connected in liquid communication. To this end, the tops of the various partitions are notched out, as shown at 140, Fig. 6, so that the bottoms 141 of the notches are positioned below the liquid level in the compartments. The film strip F may now pass, under the liquid, directly from the rollers 32 of one drive shaft 30 to the rollers 32 of the next drive shaft. When, however, adjacent compartments contain different liquids, a filler piece 142 is positioned in and removably cemented in place in the notch 140 thus separating the different liquids. In order to now pass the film strip F over this built-up portion, it is fed between the elevated squeegee rollers 143, see Fig. 1, positioned above and between the adjacent compartments, such rollers being preferably used each time the film is passed from one treating solution to another. For the purpose of clearness, only one pair of these rollers is shown in Fig. 1. It is also apparent that by removing the filler pieces 142 the strip F may also be passed from a compartment containing one solution to an adjacent compartment containing another solution without necessitating the passing of the strip through the rollers 143. In such case, however, the solutions in the adjacent compartments must obviously be maintained below the bottoms 141 of the notches 140. The number of compartments for any particular treating liquid may be thus readily increased or decreased merely by removing or replacing various filler strips 142. This flexibility provides a machine which is adapted to process different types of photographic film.

The operation of the machine may be briefly outlined as follows: The film strip F which is to be processed is fed from the supply reel 11 through the film takeup 12, over the continuously and positively driven feed-in roller 13, to the pulleys 32 on the first drive shaft 30 in the wet section 14. When the machine is first put into operation, a leader strip is fed through the machine, as is well known. The film strip is arranged in helical loops 33 over the roller 32 on the upper drive shaft 30 and the lower idler shaft 31. The film is thus looped through the entire machine, being propelled by the loosely mounted or tendency driven pulleys 32 of the various drive shafts 30. Power is transmitted to the drive shafts 30 by means of the floating power-belt 43 or 43a, the lineal speed of which is slightly in excess of that required to propel the film through the machine. The power taken off this floating belt by the drive shafts 30 is controlled by means of the small pressure rollers 66 which press the belt 43 or 43a into engagement with the pulleys 42 or 42a which are operatively connected to the drive shafts 30 through the shafts 39 and the chains 40. The movement of each small roller 66 is controlled by the position of the preceding lower pulley floater 53 which carries an idler shaft 31, so that these floaters thus control the power transmitted to the next drive shaft in direct proportion to the film speed at that point. The film tension is primarily controlled by the weight of the floaters 53. An excess tendency drive is provided by making the drive shafts 30 of a larger diameter than the idler shafts 31.

The drive, and the control therefore, in the drying and film reserve sections of the machine is the same in principle as that in the wet section. The film roller 17 is supported and driven by a peripheral engaging roller 99 mounted on a shaft 110 which is operatively connected to and driven by the floating power belt 43. This rotation of the film roller 17 is controlled by the floater shaft 31a in the section 16, which broadly constitutes a part of the drying section. Rotation of the film roller 17 is thus controlled by the rate of discharge of the film strip from the drying section.

It is thus apparent that the present invention provides a film developing machine which is adapted, without adjustments, to handle various films irrespective of the degree of expansion or contraction therein. It is also apparent that the speed of travel of the strip at different points throughout the machine is automatically varied and controlled to compensate for the stretching and/or shrinking of the film strip. It is also further evident, that the various drive shafts take off just enough power from the floating power-belt to propel the strip through the machine at the required speed. It is further apparent that in view of the fact that the tension is primarily determined by the weight of the lower pulley floaters, the film strip will be propelled through the machine at a substantially uniform tension.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

I claim:

1. A film treating apparatus comprising, in combination, fluid treating compartments, a plurality of independent drive shafts, drive pulleys mounted on said shafts for moving a film strip through said compartments, a plurality of idler shafts, driven pulleys carried by said idler shafts, said strip being arranged in loops over said pulleys, said drive shafts being of a larger diameter than said idler shafts to provide sufficient drive for said drive pulleys to propel the strip through the apparatus and to overcome the friction of said pulleys on said idler shafts as well as the fluid drag on said strip and all of said pulleys, and means for independently driving each drive shaft.

2. A film treating apparatus comprising, in combination, fluid treating compartments, a plurality of independent drive shafts, drive pulleys of equal outer diameter loosely mounted on and frictionally driven by said drive shafts for moving a film strip through said compartments, a plurality of idler shafts of smaller diameter than said drive shafts, driven pulleys of the same outer diameter as said drive pulleys loosely mounted on said idler shafts, said strip being arranged in loops over said pulleys, said larger drive shafts providing an excess tendency drive for moving said strip through said apparatus, a single means for independently driving the various drive shafts, and means acting on said last-mentioned means for independently connecting said driving means to said drive shafts.

3. A film treating apparatus comprising, in combination, fluid treating compartments, a plurality of independent drive shafts, drive pulleys of equal outer diameter loosely mounted on and frictionally driven by said drive shafts for moving a film strip through said compartments, a plurality of idler shafts of smaller diameter than said drive shafts, driven pulleys of the same outer diameter as said drive pulleys loosely mounted on said idler shafts, said strip being arranged in loops over said pulleys, said larger drive shafts providing an excess tendency drive for moving said strip through said apparatus, a single means for independently driving the various drive shafts, and means for maintaining the strip at substantial constant tension during its passage through the machine.

4. A film treating apparatus comprising, in combination, fluid treating compartments, a plurality of independent drive shafts, drive pulleys of equal outer diameter loosely mounted on and frictionally driven by said drive shafts for moving a film strip through said compartments, a plurality of idler shafts of smaller diameter than said drive shafts, driven pulleys of the same outer diameter as said drive pulleys loosely mounted on said idler shafts, said strip being arranged in loops over said pulleys said larger drive shafts providing a tendency drive for said drive pulleys in excess of that necessary to move the strip through the apparatus, a single floating power belt for driving all of said drive shafts, and means controlled by said idler shafts for independently varying the speed of each drive shaft.

5. In a film treating apparatus, the combination with a plurality of independent drive shafts, drive pulleys mounted on said shafts for moving a film strip through the apparatus, floating idler shafts, driven pulleys carried by said idler shafts, said pulleys having a film strip looped thereover, of means moving at a constant rate for independently driving each of said drive shafts to move said strip through said apparatus, and means controlled by said idler shafts and movable into engagement with said driving means for independently connecting each of said drive shafts to said driving means.

6. In a film treating apparatus, the combination with a plurality of independent drive shafts, drive pulleys mounted on said shafts for moving a film strip through the apparatus, floating idler shafts, driven pulleys carried by said idler shafts, said pulleys having a film strip looped thereover, of a single endless member moving at a constant speed for driving all of the said drive shafts to move said strip through said apparatus, and means controlled by said idler shafts for independently regulating the speed of said drive shafts.

7. In a film treating apparatus, the combination with a plurality of independent drive shafts, drive pulleys mounted on said shafts for moving a film strip through the apparatus, floating idler shafts, driven pulleys carried by said idler shafts, said pulleys having a film strip looped thereover, of an endless floating belt for driving all of said drive shafts to move said strip through said apparatus, means for driving said belt, and means controlled by said idler shafts for independently connecting said belt to each of said drive shafts to control the speed of the latter.

8. In a film treating apparatus, the combination with a plurality of independent drive shafts, drive pulleys mounted on said shafts for moving a film strip through the apparatus, floating idler shafts, driven pulleys carried by said idler shafts, said pulleys having a film strip looped thereover, of a single means for driving all of said drive shafts to move said strip through said apparatus, means adapted to directly engage said drive means to separately connect each of said drive shafts to said driving means, and means operated by said idler shafts for controlling said last mentioned means.

9. In a film treating apparatus, the combination with a plurality of independent drive shafts, drive pulleys mounted on said shafts for moving a film strip through the apparatus, floating idler shafts, driven pulleys carried by said idler shafts, said pulleys having a film strip looped thereover, of an endless floating belt for driving all of said drive shafts to move said strip through said apparatus, means for driving said belt, a roller arranged to engage and move said belt to operatively connect the latter to one of said drive shafts, and means for controlling the movement of said roller from one of said idler shafts.

10. In a film treating apparatus, the combination with a plurality of independent drive shafts, drive pulleys mounted on said shafts for moving a film strip through the apparatus, floating idler shafts, driven pulleys carried by said idler shafts, said pulleys having a film strip looped thereover, of an endless floating belt for driving all of said drive shafts to move said strip through said apparatus, means for driving said belt, a plurality of movable rollers for operatively connecting said belt to each of said drive shafts so that the latter may be driven by said belt, and means for independently controlling each of said rollers.

11. In a film treating appartus, the combination with a plurality of independent drive shafts, drive pulleys mounted on said shafts for moving a film strip through the apparatus, floating idler shafts, driven pulleys carried by said idler shafts, said pulleys having a film strip looped thereover, a take-up roller, of a single means for independently driving each of said drive shafts and said take-up roller to move said strip through said apparatus, and means controlled by said idler shafts for separately and independently connecting each of said drive shafts and said take-up roller to said driving means.

12. In a film treating apparatus, the combination with a plurality of independent drive shafts, drive pulleys mounted on said shafts for moving a film strip through the apparatus, floating idler shafts, driven pulleys carried by said idler shafts, said rollers having a film strip looped thereover, a take-up roller, of a single means for independently driving each of said drive shafts and said take-up roller to move said strip through said apparatus, means controlled by certain of said idler shafts for separately connecting each of said drive shafts to said driving means, and means controlled by another of said idler shafts for operatively connecting said take-up roller to said driving means.

13. In a film treating apparatus, the combination with a plurality of independent drive shafts, drive pulleys mounted on said shafts for moving a film strip through the apparatus, floating idler shafts, driven pulleys carried by said idler shafts, said pulleys having a film strip looped thereover, a take-up roller, of an endless floating belt for driving all of said drive shafts and said take-up roller to move said strip through said apparatus, means for driving said belt, means connected to and controlled by certain of said idler shafts for separately and independently connecting each of said drive shafts to said belt, means for driving said take-up roller from said endless belt, and means controlled by another of said idler shafts for operatively connecting said last-mentioned means to said endless belt.

14. In a film treating apparatus, the combination with a liquid treating section, a drying section, a plurality of independent drive shafts in each of said sections, drive pulleys mounted on said shafts, floating idler shafts in each of said sections, driven pulleys carried by said idler shafts, said pulleys having a film strip looped thereover, of an endless floating belt for driving all of said drive shafts to move said strip through said apparatus, separate movable rollers for independently connecting said belt to each of said drive shafts, and means connecting each of said movable rollers to an adjacent idler shaft so that the movement of the latter will control said movable roller.

15. In a film treating apparatus, the combination with a liquid treating section, a drying section, a plurality of independent drive shafts in each of said sections, drive pulleys mounted on said shafts, floating idler shafts in each of said sections, driven pulleys carried by said idler shafts, said pulleys having a film strip looped thereover, of an endless floating belt for driving all of said drive shafts to move said strip through said apparatus, separate movable rollers for independently connecting said belt to each of said drive shafts, a member connecting each of said movable rollers to an adjacent idler shaft so that the movement of the latter will control said movable roller, a take-up roller, a drive for said take-up roller, a non-slip belt for driving said take-up roller from said endless belt, and means operated and controlled by an idler shaft in said drying section to operatively connect said non-slip belt to said floating belt.

16. In a film treating apparatus, the combination with a liquid treating section, a drying section, a plurality of drive and idler shafts in each of said sections, film propelling pulleys mounted on said shafts, means for elevating the drive and idler shafts in said wet section to permit the looping of a film strip thereover, of an endless belt for driving all of said drive shafts in said wet and dry sections, and means associated with said endless belt by which the portion of said belt connected to said liquid section may be moved as a unit with the drive and idler shafts thereof.

17. In a film treating apparatus, the combination with a liquid treating section, a drying section, a plurality of drive and idler shafts in each of said sections film propelling pulleys mounted on said shafts, means for elevating the drive and idler shafts in said wet section to permit the looping of a film strip thereover, of an endless belt for driving all of said drive shafts in said wet and dry sections, a pair of loops formed in said belt intermediate said sections, and vertically movable pulleys suspended in said loops, said pulleys and said loops providing an arrangement whereby the portion of said belt connected to said liquid section may be moved as a unit with the drive and idler shafts thereof.

18. In a film treating apparatus, the combination with a liquid treating section, a drying section, a plurality of drive and idler shafts in each of said sections, film propelling pulleys mounted on said shafts, means for elevating the drive and idler shafts in said wet section to permit the looping of a film strip thereover, of an endless belt for driving all of said drive shafts in said wet and dry sections, a pair of loops formed in said belt intermediate said sections, a pair of pulleys suspended in said loops, a slide on which said pulleys are rotatably mounted, and a guide on which said slide is movably mounted, said pulleys and movable slide providing an arrangement by which the portion of said belt connected to said wet section may be moved as a unit with the drive and idler shafts thereof.

19. In a film treating apparatus, the combination with a liquid treating section, a drying section, a plurality of independent drive shafts in each of said sections, drive pulleys mounted on said shafts, floating idler shafts in each of said sections, driven pulleys carried by said idler shafts, said pulleys having a film strip looped thereover, of an endless floating belt for driving all of said drive shafts to move said strip through said apparatus, separate movable rollers for independently connecting said belt to each of said drive shafts, a member connecting each of said movable rollers to an adjacent idler shaft so that the movement of the latter will control said movable roller to regulate the speed of the next drive shaft, means for simultaneously elevating all the drive and idler shafts in said liquid treating section to permit threading, and means associated with said endless belt intermediate said liquid section and said drying section by which the portion of said belt connected to said liquid section may be moved as a unit with the drive and idler shafts thereof.

20. In a film treating apparatus, the combination with a liquid treating section, a drying section, a plurality of independent drive shafts in each of said sections, drive pulleys mounted on said shafts, floating idler shafts in each of said sections, driven pulleys carried by said idler shafts, said pulleys having a film strip looped thereover, of an endless floating belt for driving all of said drive shafts to move said strip through said apparatus, separate movable rollers for independently connecting said belt to each of said drive shafts, a member connecting each of said movable rollers to an adjacent idler shaft so that the movement of the latter will control said movable roller, a take-up roller, a drive for said take-up roller, a tight belt connecting said take-up roller drive with a drive shaft adjacent the discharge end of said drying section, a movable roller for independently connecting said floating belt to said last mentioned drive shaft, means connecting said last-mentioned roller to the last idler shaft in said drying section so as to control the speed of said take-up roller therefrom, a weighted slide positioned intermediate said liquid and drying sections, and a pair of rollers mounted on and movable with said slide and positioned in depending loops formed in said endless belt between said sections, said weighted slide and its rollers permitting the portion of said endless belt associated with said liquid section to be elevated as a unit with the drive and idler shafts thereof.

21. In a film treating apparatus, the combination with a plurality of independent drive shafts, drive pulleys mounted on said shafts for moving a film strip through the apparatus, idler shafts, driven pulleys carried by said idler shafts, said pulleys having a film strip looped thereover, of an endless power-belt for driving all of said drive shafts to move said strip through said apparatus, a plurality of floating weighted racks in which said idler shafts are mounted, said racks providing the main means for tensioning said strip, a movable pressure roller arranged to engage said belt to move the latter into driving engagement with one of said drive shafts, and means connecting said roller with the preceding floating rack whereby the movement of the latter controls the speed of the following drive shaft.

22. In an apparatus for moving a continuous web of strip material, the combination with a drive shaft for moving said web through said apparatus, of means including an endless floating power belt moving at a uniform speed for driving said shaft, means suspended by said web to tension the latter, and means comprising a pressure roller operatively connected to said tensioning means and movable into engagement with said belt for controlling said driving means from said tensioning means.

23. In an apparatus for moving a continuous web of strip material, the combination with a drive shaft for moving said web through said apparatus, of a constantly driven belt connectable to said drive shaft to drive the latter, a weighted floater suspended in and supported by said web to tension the latter, and a movably mounted pressure roller operatively connected to said floater and movably thereby to engage said belt to operatively connect said belt to said drive shaft to control the latter.

24. In an apparatus for moving a continuous web of strip material, the combination with a drive shaft for moving said web through said apparatus, of means moving at a uniform speed connectable to said drive shaft to drive the latter, a weighted floater suspended in and supported by said web to tension the latter, clutch means comprising a member movable into engagement with said moving means for connecting said drive shaft to and disconnecting it from said driving means, and means for controlling said clutch from said floater.

25. A film treating apparatus comprising in combination, a liquid treating section, a drying section, a plurality of upper drive shafts and a plurality of lower idler shafts in each of said sections, weighted floating racks in which said idler shafts are mounted, frames in which said drive shafts and said floating racks are carried, means for raising the frames out of said web section, pulleys mounted on said shafts for moving a film strip through said apparatus, said strip being tensioned mainly by reason of the weight of said racks, an endless floating powerbelt for driving all of said drive shafts, means for controlling the speed of each drive shaft from the preceding floating rack, and means associated with said endless belt by which the portion of said floating belt connected to said web section may be moved as a unit with the frames.

26. A film apparatus comprising, in combination, a liquid treating section, a drying section, a plurality of drive and idler shafts in each of said sections, pulleys loosely mounted on said shafts, said drive shafts being of a larger diameter than said idler shafts to impart sufficient tendency drive to move a film strip through said apparatus, means for raising the drive and idler shafts of said wet section to permit threading of the film strip thereover, means for tensioning said strip, a feed-in pulley of smaller diameter than said first-mentioned pulleys for feeding said strip to said wet section at a slower rate than when it is being propelled by said first-mentioned pulleys, a take-up roller, a single means for driving said feed-in pulley, said drive shafts and said take-up roller, means movable into engagement with said single means for controlling the power taken by each of said drive shafts and said take-up roller from said driving means, and means actuated by said tensioning means for moving said control means.

JOHN G. CAPSTAFF.